Jan. 24, 1933.   M. P. BROUN   1,895,372
HEATER
Filed March 8, 1932   2 Sheets-Sheet 2
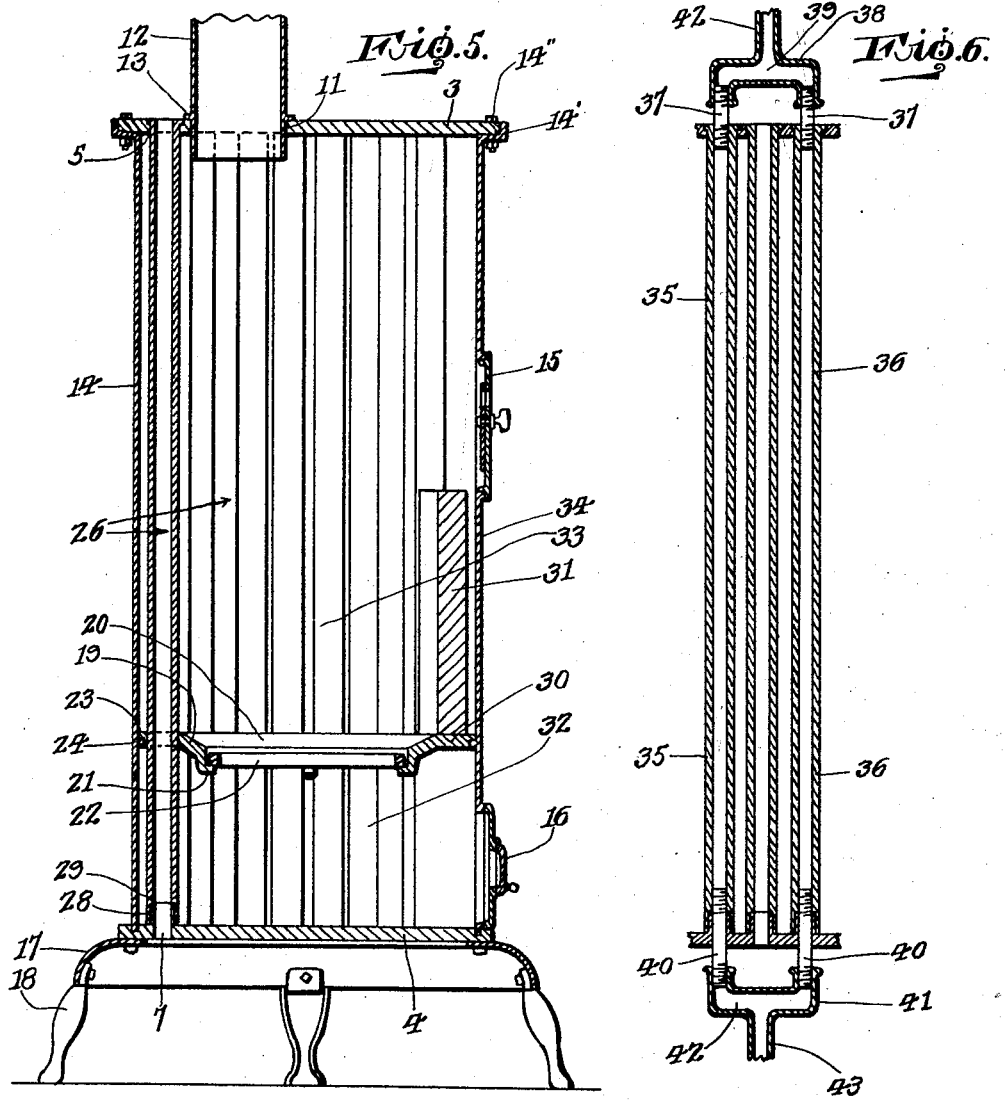
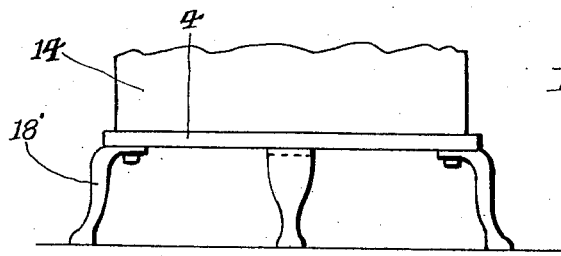
Inventor
Michael. P. Broun
By Geo. P. Kimmel
Attorney Patented Jan. 24, 1933

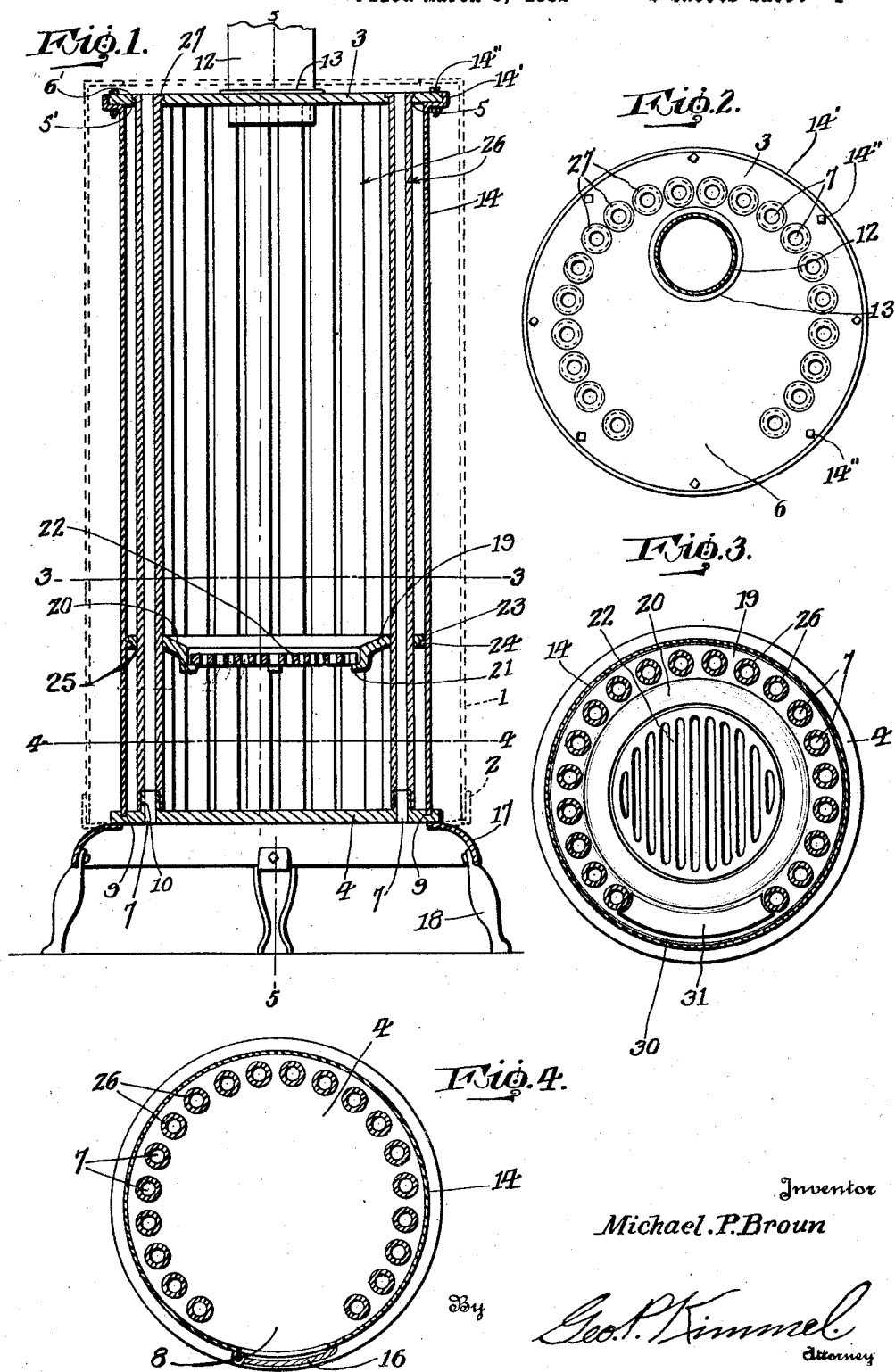

1,895,372

UNITED STATES PATENT OFFICE

MICHAEL P. BROUN, OF GETTYSBURG, SOUTH DAKOTA

HEATER

Application filed March 8, 1932. Serial No. 597,557.

This invention relates to a heater of the stove or furnace type and has for its object to provide, in a manner as hereinafter set forth, a heater so constructed and arranged to provide for heating air and for discharging the heated air in an enclosed space for increasing the temperature of the latter, as well as for heating water simultaneously with the heating of air.

A further object of the invention is to provide, in a manner as hereinafter set forth, a heater including a circular row of closely arranged heating flues capable of being used for the passage of air, or certain of them for the passage of air and the other for the passage of water whereby the air and water will be heated when travelling upwardly through the flues, and with the latter providing a portion of the wall of the combustion chamber or fire pot of the stove.

A further object of the invention is to provide, in a manner as hereinafter set forth, a heater including a set of closely arranged, vertically disposed heating flues extending from the bottom of the ash pit, through the bottom of the combustion chamber or fire pot, to the head or top of the stove, open at each end, providing for heating air and for the discharging of the heated air into an inclosed space.

A further object of the invention is to provide, in a manner as hereinafter set forth, a heater so constructed and arranged whereby it is capable of being used as a boiler for a laundry or any other place where a quantity of hot water is needed and when so used the heat given off will comfortably heat the room in which the heater is arranged with no additional expense.

A further object of the invention is to provide, in a manner as hereinafter set forth, a heater so constructed and arranged whereby it can be employed in connection with the heating of a room adjacent the room in which the heater is arranged by the circulation of hot water.

A further object of the invention is to provide, in a manner as hereinafter set forth, a heater including air heating flues so constructed and arranged whereby cold air is sucked up from the floor, upon which the heater is supported up through the flues by the draft created by the heating of the air in the flues and the air discharged in a heated condition into the room in which the heater is arranged.

A further object of the invention is to provide, in a manner as hereinafter set forth, a heater including a set of air heating flues capable of being used in a laundry room for drying of clothes, as the flues provide for the circulating of air rapidly taking in the damp air at the bottom of the heater and discharging the air in a heated condition at the top of the heater into the room.

A further object of the invention is to provide, in a manner as hereinafter set forth, a heater including a set of air heating flues so constructed and arranged relatively to each other within the fire chamber of the heater to provide for the flues being heated on all sides so that the air in the flues will become rapidly heated thereby causing a rapid circulation from off the floor through the flues and into the room.

Further objects of the invention are to provide, in a manner as hereinafter set forth, a heater for the purpose referred to which is comparatively simple in its construction and arrangement, strong, durable, compact, thoroughly efficient in its use, readily assembled, capable of being expeditiously repaired when occasion requires, and comparatively inexpensive to manufacture.

To the above ends, and others which may hereinafter appear, the invention consists of such parts, and such combination of parts which fall within the scope of the invention as claimed.

In the drawings:

Figure 1 is a vertical sectional view of a heater, in accordance with this invention and further illustrating in dotted lines an enclosing jacket therefor when the latter is employed as a stove.

Figure 2 is a top plan view of the heater with the jacket omitted.

Figure 3 is a section on line 3—3 Figure 1 with the jacket omitted.

Figure 4 is a section on line 4—4 Figure 1 with the jacket omitted.

Figure 5 is a vertical sectional view of the heater taken at right angles to Figure 1 and with the jacket omitted.

Figure 6 is a fragmentary view in vertical section of the heater showing the adaptation thereof for simultaneously heating air and water.

Figure 7 is a fragmentary view in elevation of a modified form.

The heater may be of any suitable contour such as round, square, rectangular or oval and is shown by way of example round.

When the heater is employed as a stove or furnace, it may be encompassed by a jacket of the desired form and arrangement, and by way of example, the heater is illustrated in Figure 1 as being encompassed by a jacket of a contour corresponding to that of the heater as a stove. The jacket is indicated at 1 and is supported upon laterally extending brackets 2 secured to the heater at points above the legs for the latter. It is understood that the jacket is not an essential feature of the invention as the heater is capable of performing its function without the employment of a jacket.

The heater includes a head member 3 and a bottom member 4 and both of which are of circular form and of the desired thickness. The member 3 is formed with a row of closely arranged parallel openings 5 in proximity to its edge and the row extends from one side of the front part of member 3 to the other side of such part. The front part of member 3 is indicated at 6. Each opening 5 is formed of two different diameters whereby the wall thereof will be formed with a shoulder 5' constituting a seat. The part of largest diameter of each opening 5 is indicated at 6'. The member 4 is formed with a row of closely arranged, parallel openings 7 in proximity to its edge and the row extends from one side of the front part of member 4 to the other side of such part. The front part of member 4 is indicated at 8. The end openings 5 of the row of openings in member 3 are spaced from each other. The end openings 7 of the row of openings in the member 4 are spaced from each other. A circular groove 9 is formed in the upper face of member 4 between the edge of the latter and openings 7. Formed integral with the upper face of member 4 is a row of vertical nipples 10 and each of the latter has its inner face registering with the wall of an opening 7. The member 3 eccentrically with respect thereto is formed with an enlarged opening 11 for the reception of a discharge flue 12 for conducting off the products of combustion from the heater. The flue 12 depends below member 3 and is formed with a lateral flange 13 which seats upon the upper face of the latter.

The body part of the heater is of tubular form and indicated at 14, and has its lower end seated in the groove 9 and at its upper end is formed with an angle shaped outwardly directed flange 14' which supports and encompasses the edge of member 3. Holdfast devices 14" are employed for detachably connecting flange 14' to member 3. The diameter of the body part 14 below flange 14' is less than that of the members 3, 4. The body part 14' is formed with a door 15 for access to the combustion chamber or fire pot of the heater. The body part 14 is also provided with a door 16 for access to the ash pit of the heater.

The member 4 may be suitably secured to a base 17 having attached thereto supporting legs 18, as shown in Figures 1 and 2, or the member 4 may have supporting legs 18' directly attached thereto, as shown in Figure 7. The brackets 2 are illustrated as being secured to the member 4.

Arranged within body part 14 at a point between its transverse median and its lower end is a shaker grate structure comprising an annular member 19 formed with a downwardly extending inclined inner portion 20 provided with depending, spaced lugs 21 upon which are mounted the grate section 22. The member 19 at the outer edge and flush with its upper face is formed with an outwardly directed annular flange 23 which seats upon an annular ledge 24 formed on the inner face of body part 14. The flange and ledge coact to support the grate structure within body part 14. The member 19 in proximity to its outer edge is formed with a row of closely arranged openings 25 which align with the openings 5 and 7.

The heater includes a set of flue elements 26 which correspond in number to the number of openings of any one of the rows of openings referred to. Each element has an outwardly extending annular flange 27 at its top and its lower portion of larger inner diameter, as at 28 to provide a shoulder 29. The elements 26 extend through the openings 5 and 25 and encompass the nipples 10, the latter and openings 7 forming continuations of the elements 26. The flanges 27 seat upon shoulders 5' and the shoulders 29 seat upon the top edges of the nipples 10. By this arrangement the products of combustion are prevented from passing through members 3 and ashes from coming out onto the floor. As the elements 26 are free and removable should one warp or burn out at anytime it can be removed and readily replaced with a new one.

The front part of member 19 of the grate structure is indicated at 30, and mounted thereon, as well as extending to the door 15 and arranged between the end elements of the set of elements is a vertically disposed fitting 31 providing the lower front wall portion of the combustion chamber or fire pot.

That part of the heater below the grate structure and member 4 provides the ash pit 32 and the wall thereof is formed by the lower part of elements 26 and lower portion of body part 14. That part of the heater between member 3 and the grate structure forms the combustion chamber or fire pot 33. The fuel to be consumed will never extend above the fitting 31, the latter, in connection with the elements 26 and front portion of the body part forming the wall of chamber or fire pot 33. The front portion of body part 14 is indicated at 34.

With reference to Figure 6, certain of the flue elements and which are designated 35, 36 have internal threads at the upper and lower portions thereof. Extending into the upper ends of elements 35, 36 as well as threadedly engaging therewith are tubular peripherally threaded coupling members 37 for a hollow casting 38 providing a hot water receiving chamber 39. The members 37 threadedly engage in casting 38. Extending into the lower ends of elements 35, 36, as well as threadedly engaging therewith are tubular peripherally threaded coupling members 40 for a hollow casting 41 which provides a cold water receiving chamber 42. The members 40 threadedly engage with and in casting 41. Casting 38 is formed with an upstanding tubular extension 42 for coupling to a hot water supply line. Casting 41 has a depending tubular extension 43 for coupling to a cold water supply line. The coupling members 40 extend through the nipples 10. Figure 6 shows an arrangement whereby water can be heated simultaneously with the heating of air, the latter traveling through the flue elements other than the flue elements designated 35, 36. The casting 41 is arranged below base 17.

What I claim is:—

1. In a heater, a bottom member formed with openings and upstanding tubular nipples registering with said openings, a grate structure formed with openings aligning with said nipples and arranged in superposed relation with respect to said bottom member, a top member formed with openings aligning with the openings in said grate structure and arranged in superposed relation with respect to said grate structure, a set of parallel heating flues seated at their upper ends in said top member, extending through the openings in the latter and through the opening in said grate structure, extending to said bottom member and encompassing and seated on said nipples, a tubular body part interposed between said members, supporting said grate structure and surrounding said flange, that portion of the heater below the grate structure providing an ash pit, that part of the heater above said grate structure providing a fire pot, said body part having a door for the ash pit and a door for the fire pot, the end flues of said set of flues arranged at opposite sides of the front of said grate structure and members, and an upstanding fitting positioned between the end flues of said set, supported upon said grate structure and arranged below the top of the door for the fire pot.

2. In a heater, a bottom member formed with openings and upstanding tubular nipples registering with said openings, a grate structure formed with openings aligning with said nipples and arranged in superposed relation with respect to said bottom member, a top member formed with openings aligning with the openings in said grate structure and arranged in superposed relation with respect to said grate structure, a set of parallel heating flues seated at their upper ends in said top member, extending through the openings in the latter and through the opening in said grate structure, extending to said bottom member and encompassing and seated on said nipples, a tubular body part interposed between said members, supporting said grate structure and surrounding said flange, that portion of the heater below the grate structure providing an ash pit, that part of the heater above said grate structure providing a fire pot, said body part having a door for the ash pit and a door for the fire pot, the end flues of said set of flues arranged at opposite sides of the front of said grate structure and members, an upstanding fitting positioned between the end flues of said set, supported upon said grate structure and arranged below the top of the door for the fire pot, a cold water supply means connected to and communicating with certain of said flues at the lower ends thereof, and a hot water conducting off means connected to and communicating with such flues at the upper ends thereof.

3. In a heater, a bottom member formed with openings and upstanding tubular nipples registering with said openings, a grate structure formed with openings aligning with said nipples and arranged in superposed relation with respect to said bottom member, a top member formed with openings aligning with the openings in said grate structure and arranged in superposed relation with respect to said grate structure, a set of parallel heating flues seated at their upper ends in said top member, extending through the openings in the latter and through the opening in said grate structure, extending to said bottom member and encompassing said nipples, a tubular body part interposed between said members, supporting said grate structure and surrounding said flues, that portion of the heater below the grate structure providing an ash pit, that part of the heater above said grate structure providing a fire pot, said body part having a door for the ash pit and a door for the fire pot, the end flues of said set of flues arranged at opposite sides of the front of said grate structure and members, and an upstanding fitting positioned between the end flues of said set, supported upon said grate structure and arranged below the top of the door for the fire pot.

4. In a heater, a bottom member formed with openings and upstanding tubular nipples registering with said openings, a grate structure formed with openings aligning with said nipples and arranged in superposed relation with respect to said bottom member, a top member formed with openings aligning with the openings in said grate structure and arranged in superposed relation with respect to said grate structure, a set of parallel heating flues seated at their upper ends in said top member, extending through the openings in the latter and through the opening in said grate structure, extending to said bottom member and encompassing and seated on said nipples, and a tubular body part interposed between said members, supporting said grate structure and surrounding said flues, said body part having its top formed with an outwardly directed angle-shaped flange seating against the lower face of and encompassing the edge of said top member.

5. In a heater, a bottom member formed with openings and upstanding tubular nipples registering with said openings, a grate structure formed with openings aligning with said nipples and arranged in superposed relation with respect to said bottom member, a top member formed with openings aligning with the openings in said grate structure and arranged in superposed relation with respect to said grate structure, a set of parallel heating flues seated at their upper ends in said top member, extending through the openings in the latter and through the opening in said grate structure, extending to said bottom member and encompassing said nipples, and a tubular body part interposed between said members, supporting said grate structure and surrounding said flues, said body part having its top formed with an outwardly directed angle-shaped flange seating against the lower face of and encompassing the edge of said top member.

6. In a heater, a bottom member formed with a set of closely arranged openings and upstanding tubular nipples registering with said openings, the end openings of said set arranged at opposite sides of the front of said member, a grate structure arranged in superposed relation with respect to said bottom member and formed with a set of closely arranged openings and with the end openings of such set arranged at opposite sides of the front of such structure, the openings in said structure aligning with said nipples, a top member arranged in superposed relation with respect to said structure and formed with a set of closely arranged openings and with the end openings of such set positioned at opposite sides of the front of the top member, the openings in the top member aligning with the openings in said structure, a set of parallel heating flues seated at their upper ends in the openings in the top member, extending through such openings and through the openings in said structure and encompassing said nipples, said nipples and openings in the bottom member forming continuations of said flues, and a hollow body part interposed between said members, supporting said structure and surrounding said set of flues exteriorly of the latter, said body part having its top formed with an outwardly directed angle-shaped flange seating against the lower face of and encompassing the edge of said top member.

In testimony whereof, I affix my signature hereto.

MICHAEL P. BROUN.